July 7, 1936.                     C. WIRTH                        2,047,047
                              ANTIRATTLING DEVICE
                              Filed Sept. 7, 1935
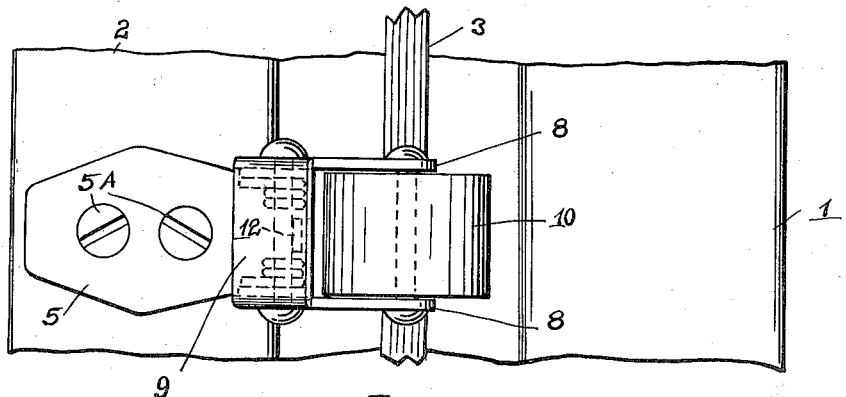
FIG. 1.
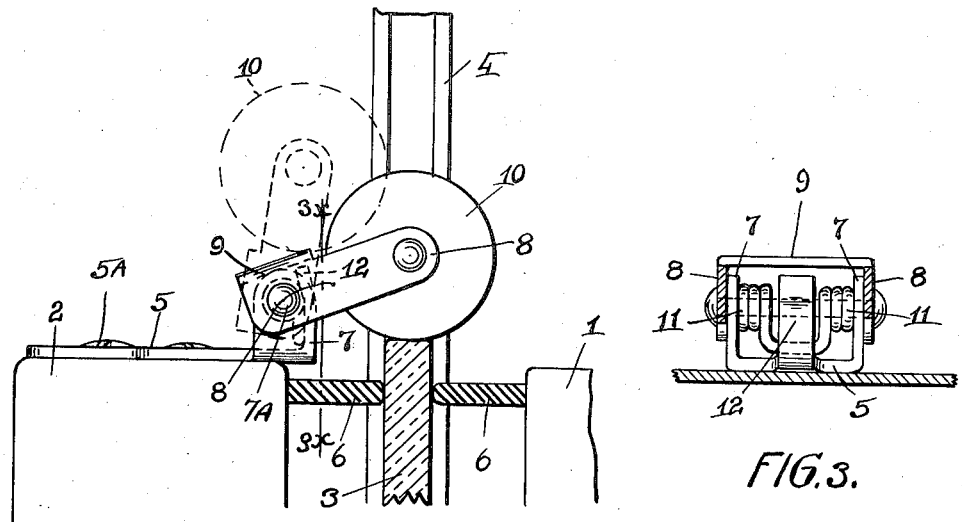
FIG. 2.                                                  FIG. 3.
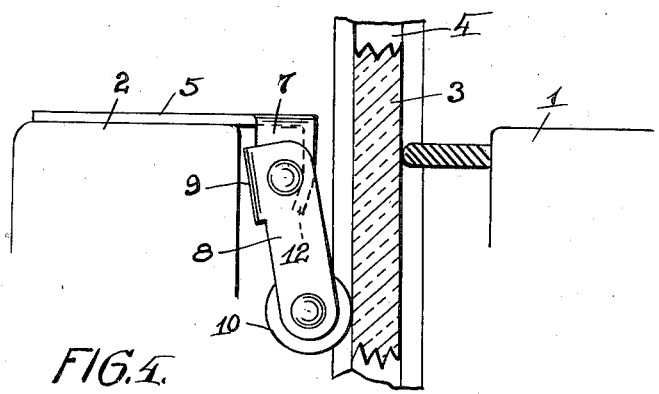
FIG. 4.
INVENTOR
CARL WIRTH
BY
ATTORNEY Patented July 7, 1936

2,047,047

UNITED STATES PATENT OFFICE 2,047,047

ANTIRATTLING DEVICE

Carl Wirth, Rochester, N. Y.

Application September 7, 1935, Serial No. 39,633

5 Claims. (Cl. 292—219)

This invention relates to improvements in antirattling devices for use in connection with sliding window panes in automobile bodies, or the like, or for use in connection with swinging windows and the invention has for its object to provide a device which is self adjusting and universally mountable so as to make it adaptable for use on all forms of window construction.

Another object of this invention is to provide an anti-rattling device which is inexpensive in its manufacture, durable in construction and extremely simple in its installation.

These and other objects and attendant advantages of this invention will become more readily apparent from the detailed description thereof which follows, reference being had to the accompanying drawing in which Figure 1 is an enlarged top plan view of the anti-rattling device as it appears mounted on an automobile window frame.

Figure 2 is an enlarged side elevation of the anti-rattling device as it appears on an automobile window frame.

Figure 3 is a vertical sectional view of the anti-rattling device taken on the line $3x$—$3x$ of Figure 2.

Figure 4 is an enlarged side elevation of the anti-rattling device as it appears mounted on an automobile window in a modified form from that illustrated in Figure 2.

In the several figures of the drawing like reference numerals indicate like parts.

In the embodiment of the invention illustrated in the drawing it is shown in combination with the frame and sliding window construction common to closed automobile bodies, but it is understood that the device can be used with equal effectiveness with other window constructions. In the drawing, reference numeral 1 indicates the outside window frame member and 2 the inner frame member between which is located the window pane 3. The ends of the window pane are slidably mounted in suitable channels 4 provided in the side of the window frame and it is in these channels that the window pane is yieldingly held against rattling by the anti-rattling device forming the subject matter of my present invention. Suitable horizontal weather strips 5 and 6 project toward the window pane 3 from the outer and inner window frame member to close the space between the bottom of the window frames and the window pane while the sides of the window pane are held against rattling in the channels 4 in the sides of the window frame by the pressure exerted against the window pane by the anti-rattling device.

The anti-rattling device comprises the base plate 5 which is suitably perforated with two holes so that one or two screws 5A may be used to clamp the base to the inside member 2 of the window frame. From the sides of the base plate at one end thereof are bent up a pair of parallel lugs 7, 7 which support the pivot pin 7A. On this pivot pin are mounted to swing a pair of parallel arms 8, 8 which are connected and spaced at their inner end by the stop plate 9 to have the resilient pressure roller 10 held pivotally mounted between their outer ends.

Surrounding the pivot pin 7A is a double coil torsion spring 11 which is formed so as to encircle the ends of the pin 7A between the lugs 7, 7 and have the free ends of the spring resting against the under side of the stop plate 9. The portion of the spring separating the two coils thereof is U shaped and projects tangentially therefrom and downwardly thereof behind the stop lug 12. This lug is bent up from the end of the base plate 5 to serve as the tensioning member for the spring 11 by reason of its engagement with the U shaped center portion of the spring. This provides an initial tension on the spring 11 which is transmitted to the stop plate 9 to cause the arms 8, 8 to swing on the pivot pin 7A until the stop plate is yieldingly forced against and rests on the top of the stop lug 12. In this position the arms 9, 9 hold the resilient pressure roller in a predetermined position from which it can be swung upwardly against the tension of the spring 11.

The device is mounted on the window so that it exerts a maximum pressure against the window pane as it moves up and down in front of it. This is illustrated in Figure 2 which shows the position of the pressure roller in full lines on top of the window pane when the window is open and in dotted lines when the window is closed. This shows that the pressure roller not only exerts a pressure against the face of the window pane while it is closed or partially opened, but it also exerts pressure against the top edge of the window pane when the window is completely opened and thus keeps the window pane from rattling while in a completely opened position. In the latter position the pressure of the roller is downward as well as slightly outward on the window pane to efficiently keep it from rattling.

In Figure 4 I have illustrated a modified form of mounting for the anti-rattling device. For this form of mounting the diameter of the pressure roller 10 is reduced in order to permit the roller and its supporting arms 8, 8 to project between the inside of the window frame and the window pane and have the pressure roller exert its pressure against the window pane below the window frame.

I claim:

1. An anti-rattling device made up of sheet stock comprising the combination of a base plate, a pair of parallel supporting lugs formed upwardly on opposite sides of the base, a stop lug formed upwardly at one end of said base substantially between said supporting lugs, a pivot pin supported by said supporting lugs in front of said stop lug and in close proximity thereto, a pair of supporting arms mounted to swing on said pivot pin, a stop plate connecting and spacing said supporting arms at one end thereof above said stop lug to have said stop lug engage the under side of said stop plate and hold said supporting arms in a predetermined position, a contact roller supported and mounted to rotate between said supporting arms, and spring means for yieldingly forcing said supporting arms with their contact roller in one direction.

2. An anti-rattling device as set forth in claim 1 in which the spring means comprise a double coil torsion spring encircling said pivot pin adapted to have the free ends of the spring engage the under side of said stop plate, a tangentially projecting loop member provided between said double coil so as to engage said stop lug and produce a uniform tension in said double coil and against said stop plate.

3. In an anti-rattling device the combination of an invertible base plate, a supporting lug provided at one end of said base plate, a pivot pin supported by said supporting lug, supporting arms pivoted on said pivot pin and spring means surrounding said pivot pin and engaging said supporting arm and base to cause that supporting arm to project to one side of said base plate and swing in a direction away from the base plate in both the upright and inverted position of said base plate.

4. In an anti-rattling device the combination of a base plate, a pair of parallel supporting lugs bent up from the sides at one end of said base plate, a pivot pin supported by said supporting lugs, a pair of arms mounted to swing on said pivot pin, a pressure roller rotatably mounted between said arms parallel to said pivot pin, spring means for swinging said arms and pressure roller and stop means for limiting the movement of said arms in one direction.

5. In an antirattling device the combination of an invertible base plate, a pivot pin supported by said base plate at one end thereof, an arm mounted to swing on said pivot pin so as to angularly project away from said base plate and provide an unobstructed top and bottom for the invertible mounting of said base plate and yielding contact means carried by said arm and rotatably mounted thereon.

CARL WIRTH.